US012146746B2

(12) United States Patent
Kato

(10) Patent No.: US 12,146,746 B2
(45) Date of Patent: Nov. 19, 2024

(54) INFORMATION PROCESSING DEVICE, CONTROL METHOD, PROGRAM AND STORAGE MEDIUM

(71) Applicant: PIONEER CORPORATION, Tokyo (JP)

(72) Inventor: Masahiro Kato, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 17/781,333

(22) PCT Filed: Dec. 1, 2020

(86) PCT No.: PCT/JP2020/044656
§ 371 (c)(1),
(2) Date: May 31, 2022

(87) PCT Pub. No.: WO2021/112074
PCT Pub. Date: Jun. 10, 2021

(65) Prior Publication Data
US 2023/0010175 A1 Jan. 12, 2023

(30) Foreign Application Priority Data
Dec. 2, 2019 (JP) ................. 2019-218074

(51) Int. Cl.
G01C 21/30 (2006.01)
(52) U.S. Cl.
CPC .................. G01C 21/30 (2013.01)

(58) Field of Classification Search
CPC ..................................... G01C 21/30
See application file for complete search history.

(56) References Cited

U.S. PATENT DOCUMENTS

2010/0157058 A1* 6/2010 Feiden ............. B60W 40/112
348/148
2021/0049780 A1* 2/2021 Westmacot ...... G01C 21/3819
2023/0003521 A1 1/2023 Kato

FOREIGN PATENT DOCUMENTS

JP 2013-257742 A 12/2013
JP 2014-130404 A 7/2014

(Continued)

OTHER PUBLICATIONS

Patent Cooperation Treaty, International Search Report, Application No. PCT/JP2020/044656, dated Jan. 15, 2021, in 4 pages.

(Continued)

Primary Examiner — Dale Moyer
(74) Attorney, Agent, or Firm — PROCOPIO, CORY, HARGREAVES & SAVITCH LLP

(57) ABSTRACT

A control unit 15 of an in-vehicle device 1 configured to acquire, from landmark data LD that is map data including position information of one or more features, plural pieces of position information of a feature which is drawn on a road surface and which exists at or around a vehicle. Then, the control unit 15 is configured to calculate a normal vector of an approximate plane calculated based on the acquired plural pieces of the position information. Then, the control unit 15 is configured to calculate at least one of a pitch angle or a roll angle of the vehicle based on the orientation of the vehicle and the normal vector.

10 Claims, 12 Drawing Sheets

(56) References Cited

FOREIGN PATENT DOCUMENTS

| JP | 2017-072422 A | 4/2017 |
| JP | 2023054315 A | 4/2023 |
| WO | 2015/151681 A1 | 10/2015 |

OTHER PUBLICATIONS

European Patent Office, Extended European Search Report, Application No. 20896176.3, dated Nov. 30, 2023, in 9 pages.
Belaroussi, et al., "Vehicle Attitude Estimation in Adverse Weather Conditions using a Camera, a GPS and a 3D road Map", 2011 IEEE Intelligent Vehicles Symposium (IV), Jun. 5-9, 2011, in 6 pages.

\* cited by examiner

INFORMATION PROCESSING DEVICE, CONTROL METHOD, PROGRAM AND STORAGE MEDIUM

CROSS-REFERENCE TO RELATED APPLICATIONS

This application is US National Stage of International Patent Application PCT/JP2020/044656, filed Dec. 1, 2020, which claims benefit of priority from Japanese Patent Application JP2019-218074, filed Dec. 2, 2019, the contents of both of which are incorporated herein by reference.

TECHNICAL FIELD

The present invention relates to a technique for estimating the posture of a vehicle.

BACKGROUND ART

Conventionally, there is known a technique for performing a vehicle position estimation based on the measurement data outputted by a measurement unit such as a radar or a camera. For example, Patent Literature 1 discloses a technique for estimating the self-position through matching between the output of the measurement sensor and the position information of feature(s) registered in advance on the map. Further, Patent Reference 2 discloses a self-vehicle position estimation technique using a Kalman filter.

PRIOR ART DOCUMENTS

Patent Literature

Patent Literature 1: JP 2013-257742A
Patent Literature 2: JP 2017-72422A

SUMMARY

Problem to be Solved by the Invention

Generally, the vehicle is constrained on the road surface, and changes in the pitch angle, roll angle, and vertical direction of the vehicle are negligibly small, though there is some fluctuation by the suspension. Therefore, in the general self-position estimation of the vehicle based on measurement data outputted by a measurement unit, the planar position and orientation of the vehicle are set as parameters to be estimated. On the other hand, when the vehicle is traveling on a slope (hill) having a large gradient or a road with a cross slope, simply by estimating the planar position and orientation of the vehicle, it is impossible to cope with changes in pitch angle and roll angle, which could lead to incorrect association between measured position of a feature measured by the measurement unit and the position of the feature registered on the map data. In contrast, in order to cope with the changes in pitch angle and/or roll angle, when the pitch angle and/or the roll angle is added as a part of the estimation parameters of self-position estimation, the calculation load increases due to an increase in the number of the estimated parameters, resulting in an issue that the self-position estimation to be done in the required time cycle does not stably terminate. Although there is a method for determining the pitch angle and roll angle of the vehicle from the data outputted by an IMU (Inertial Measurement Unit), there is also an issue that the pitch angle and the roll angle cannot be accurately calculated due to the sensitivity error and offset in a common IMU.

The present invention has been made in order to solve the above issues, and it is an object of the present invention to provide an information processing device capable of suitably estimating the posture of the vehicle.

Means for Solving the Problem

One invention is an information processing device including: an acquisition unit configured to acquire, from map data including position information of one or more features, plural pieces of position information of a feature which is drawn on a road surface and which exists at or around a moving body; a normal vector calculation unit configured to calculate a normal vector of an approximate plane calculated based on the acquired plural pieces of the position information; and an angle calculation unit configured to calculate at least one of a pitch angle or a roll angle of the moving body based on an orientation of the moving body and the normal vector.

Another invention is a control method executed by an information processing device, the control method including: acquiring, from map data including position information of one or more features, plural pieces of position information of a feature which is drawn on a road surface and which exists at or around a moving body; calculating a normal vector of an approximate plane calculated based on the acquired plural pieces of the position information; and calculating at least one of a pitch angle or a roll angle of the moving body based on an orientation of the moving body and the normal vector.

Still another invention is a program executed by a computer, the program causing the computer to function as: an acquisition unit configured to acquire, from map data including position information of one or more features, plural pieces of position information of a feature which is drawn on a road surface and which exists at or around a moving body; a normal vector calculation unit configured to calculate a normal vector of an approximate plane calculated based on the acquired plural pieces of the position information; and an angle calculation unit configured to calculate at least one of a pitch angle or a roll angle of the moving body based on an orientation of the moving body and the normal vector.

DETAILED DESCRIPTION OF PREFERRED EMBODIMENTS

Figure 1:
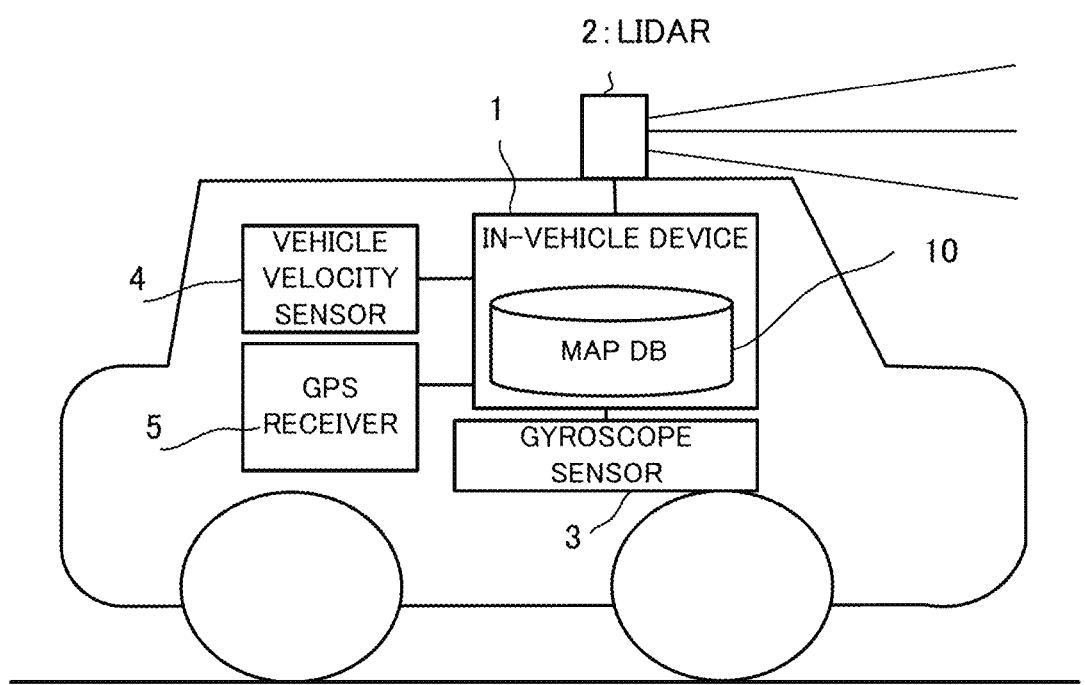
FIG. 1 is a schematic configuration diagram of a driving support system.

According to a preferred embodiment of the present invention, there is provided an information processing device including: an acquisition unit configured to acquire, from map data including position information of one or more features, plural pieces of position information of a feature which is drawn on a road surface and which exists at or around a moving body; a normal vector calculation unit configured to calculate a normal vector of an approximate plane calculated based on the acquired plural pieces of the position information; and an angle calculation unit configured to calculate at least one of a pitch angle or a roll angle of the moving body based on an orientation of the moving body and the normal vector.

Generally, a moving body is constrained on the road surface, and therefore the pitch angle and the roll angle of the moving body occur in accordance with the inclination of the road surface. Therefore, according to this mode, the information processing device calculates the normal vector of the plane which approximates the road surface based on the position information of the feature drawn on the road surface. Thereby, the information processing device can suitably calculate at least one of the pitch angle or the roll angle of the moving body based on the relation between the calculated normal vector and the orientation of the moving body.

In one mode of the information processing device, the angle calculation unit calculates the pitch angle based on an inner product of a vector indicative of a traveling direction of the moving body on a horizontal plane and the normal vector. According to this mode, the information processing device can suitably determine the pitch angle of the moving body based on the angle formed by the traveling direction of the moving body on the horizontal plane and the normal vector of the approximate plane.

In another mode of the information processing device, the angle calculation unit calculates the roll angle based on an inner product of a vector indicative of a lateral direction of the moving body on a horizontal plane and the normal vector. According to this mode, the information processing device can suitably determine the roll angle of the moving body based on the angle formed by the lateral direction of the moving body on the horizontal plane and the normal vector of the approximate plane.

In still another mode of the information processing device, the information processing device further includes a position estimation unit configured to perform position estimation of the moving body through matching between data obtained by a coordinate transformation of measurement data of a feature based on at least one of the pitch angle or the roll angle, the measurement data being outputted by a measurement unit mounted on the moving body, and the position information of the feature registered in the map data. According this mode, the information processing device performs position estimation of the moving body through matching (verification) between measurement data outputted by the measurement unit and feature position information based on the map data. In this case, the information processing device performs the coordinate transformation of the measurement data based on the calculated pitch angle or roll angle. Thereby, even when there are changes in the pitch angle or roll angle of the vehicle due to traveling on a slope or a road with a high cross slope, the information processing device can suitably estimate the position of the moving body using the measurement data.

In still another mode of the information processing device, position information of plural features is registered in the map data, wherein, if a peripheral feature existing around the moving body is included in the plural features, the position estimation unit sets, based on the position information of the peripheral feature, a prediction range where the data obtained by the coordinate transformation of the measurement data of the peripheral feature is predicted to be included and performs the position estimation of the moving body through the matching between the data included in the prediction range and the position information of the peripheral feature. By coordinate transformation of the measurement data based on the calculated pitch angle or roll angle, the information processing device can include the measurement data of the target feature of measurement in the prediction range set based on the position information of the target feature even when the vehicle is traveling on a road surface causing the pitch angle or the roll angle. Thus, even when there are changes in the pitch angle or roll angle of the vehicle due to traveling on a slope or a road with a high cross slope, the information processing device can suitably estimate the position of the moving body using the measurement data of the target feature outputted by the measurement unit.

In still another mode of the information processing device, the information processing device further includes a height calculation unit configured to calculate a height of the moving body from a reference position based on a height of the approximate plane from the reference position calculated based on a plane equation indicative of the approximate plane and information indicative of a height of the moving body from the road surface. The term "reference position" herein indicates a position to be a reference in the absolute coordinate system used in map data or the like, and an example of the reference position is the position of the altitude 0 m. According to this mode, the information processing device can suitably calculate the height of the moving body from the reference portion based on the plane equation used in the calculation of the pitch angle or the roll angle.

According to another preferred embodiment of the present invention, there is provided a control method executed by an information processing device, the control method including: acquiring, from map data including position information of one or more features, plural pieces of position information of a feature which is drawn on a road surface and which exists at or around a moving body; calculating a normal vector of an approximate plane calculated based on the acquired plural pieces of the position information; and calculating at least one of a pitch angle or a roll angle of the moving body based on an orientation of the moving body and the normal vector. By executing the control method, the information processing device can suitably calculate at least one of the pitch angle or the roll angle of the moving body based on the relation between the calculated normal vector of the approximate plane based on plural pieces of position information of the feature drawn on a road surface and the orientation of the moving body.

According to another preferred embodiment of the present invention, there is provided a program executed by a computer, the program causing the computer to function as: an acquisition unit configured to acquire, from map data including position information of one or more features, plural pieces of position information of a feature which is drawn on a road surface and which exists at or around a moving body; a normal vector calculation unit configured to calculate a normal vector of an approximate plane calculated based on the acquired plural pieces of the position information; and an angle calculation unit configured to calculate at least one of a pitch angle or a roll angle of the moving body based on an orientation of the moving body and the normal vector. By executing the program, the computer can suitably calculate at least one of the pitch angle or the roll angle of the moving body based on the relation between the calculated normal vector of the approximate plane based on plural pieces of position information of the feature drawn on a road surface and the orientation of the moving body. In some embodiments, the program is stored in a storage medium.

Embodiments

Hereinafter, preferred embodiments of the present invention are described below with reference to drawings. It is noted that a character with "^" or "-" on its top is expressed in this specification as "A^" or "A-" (where "A" is a character) for convenience.

(1) Outline of Driving Support System

FIG. 1 is a schematic configuration of a driving support system according to the present embodiment. The driving support system includes an in-vehicle device 1 that moves with a vehicle that is a moving body, a lidar (Lidar: Light Detection and Ranging, or Laser Illuminated Detection And Ranging) 2, a gyroscope sensor 3, a vehicle velocity sensor 4, and a GPS receiver 5.

The in-vehicle device 1 is electrically connected to the lidar 2, the gyroscope sensor 3, the vehicle velocity sensor 4, and the GPS receiver 5, and based on these outputs, estimates the position (also referred to as "own vehicle position") of the vehicle equipped with the in-vehicle device 1. Then, the in-vehicle device 1 performs automatic driving control of the vehicle and the like so as to travel along a route to the set destination based on the estimation result of the own vehicle position. The in-vehicle device 1 stores map database (DB: DataBase) 10 including road data and information (referred to as "landmark data LD") relating to landmarks such as features and compartment lines serving as marks provided on or near roads. Then, the in-vehicle device 1 performs estimation of the vehicle position through matching (verification) between the position of the landmark(s) indicated by the landmark data LD and the measurement result by the lidar 2.

The lidar 2 emits pulsed lasers for a predetermined angular range in the horizontal and vertical directions to thereby discretely measure the distance to an external object and then generates three-dimensional point cloud information indicating the position of the object. In this case, the lidar 2 includes: a radiation (emitting) unit for radiating (emitting) a laser beam while changing the irradiation (emitting) direction; a light receiving unit for receiving the reflected light (scattered light) which is the laser beam reflected by the object; and an output unit for outputting scan data based on the light receiving signal outputted by the light receiving unit. The scan data is generated based on the irradiation direction corresponding to the laser beam received by the light receiving unit and the response delay time of the laser beam specified based on the light receiving signal described above. In general, the closer the distance to the object is, the higher the accuracy of the lidar's distance measurement value becomes, and the farther the distance is, the lower the accuracy thereof becomes. The lidar 2, the gyroscope sensor 3, the vehicle velocity sensor 4, the GPS receiver 5, respectively, supply the output data to the in-vehicle device 1. The in-vehicle device 1 is an example of an "information processing device" in the present invention, the lidar 2 is an example of a "measurement unit" in the present invention.

Incidentally, the driving support system, in place of or in addition to having the gyroscope sensor 3, may have an inertial measurement unit (IMU) for measuring the acceleration and angular velocity of the vehicle in the three-axis direction.

(2) Configuration of In-Vehicle Device

Figure 2:
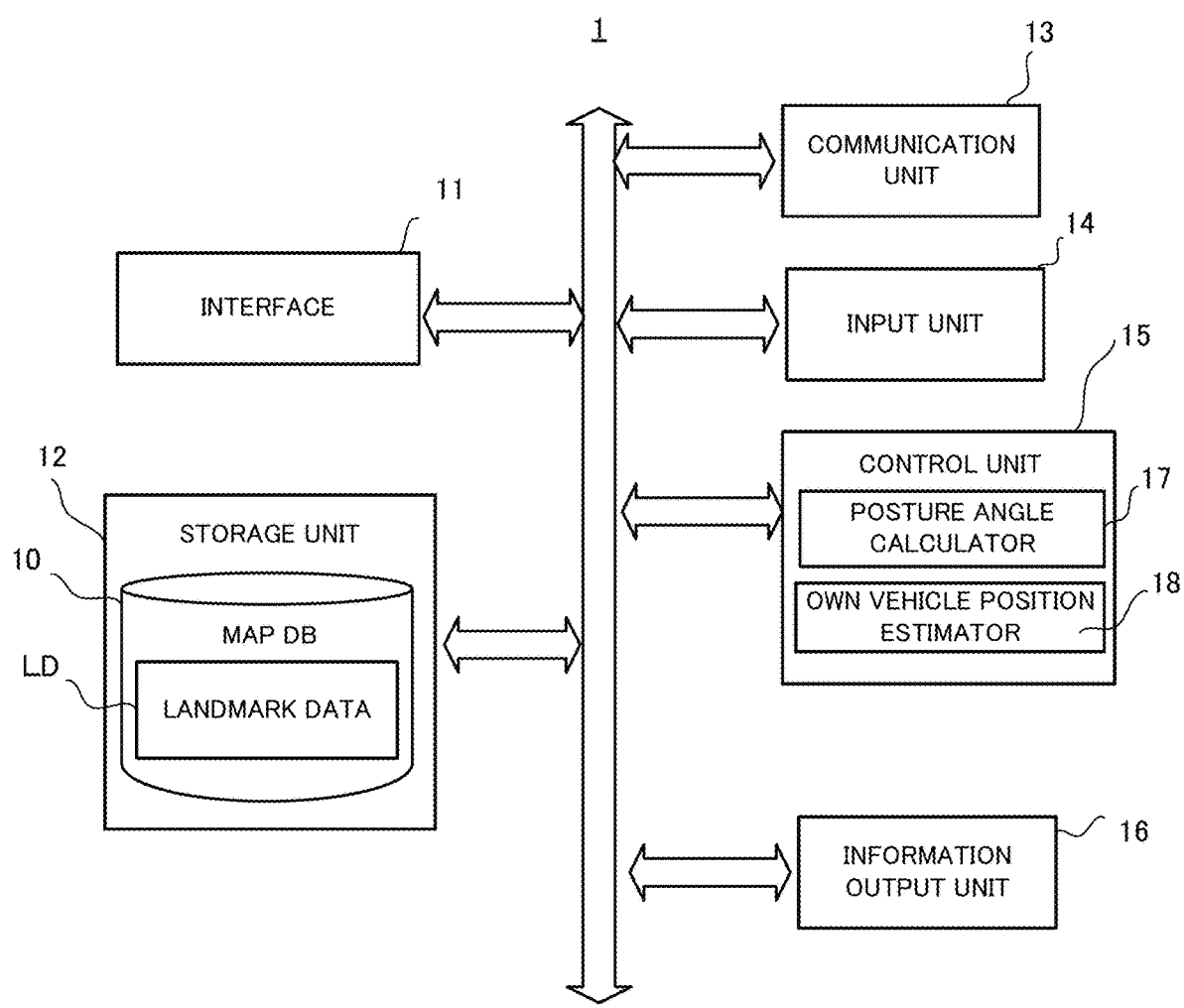
FIG. 2 is a block diagram showing a functional configuration of an in-vehicle device.

FIG. 2 is a block diagram showing a functional configuration of the vehicle-mounted device 1. The in-vehicle device 1 mainly includes an interface 11, a storage unit 12, a communication unit 13, an input unit 14, a control unit 15, and an information output unit 16. Each of these elements is connected to each other via a bus line.

The interface 11 acquires output data from sensors such as the lidar 2, the gyroscope sensor 3, the vehicle velocity sensor 4, and the GPS receiver 5, and supplies the output data to the control unit 15. Further, the interface 11 supplies a signal relating to the driving control of the vehicle generated by the control unit 15 to the electronic control unit (ECU: Electronic Control Unit) of the vehicle.

Figure 3:
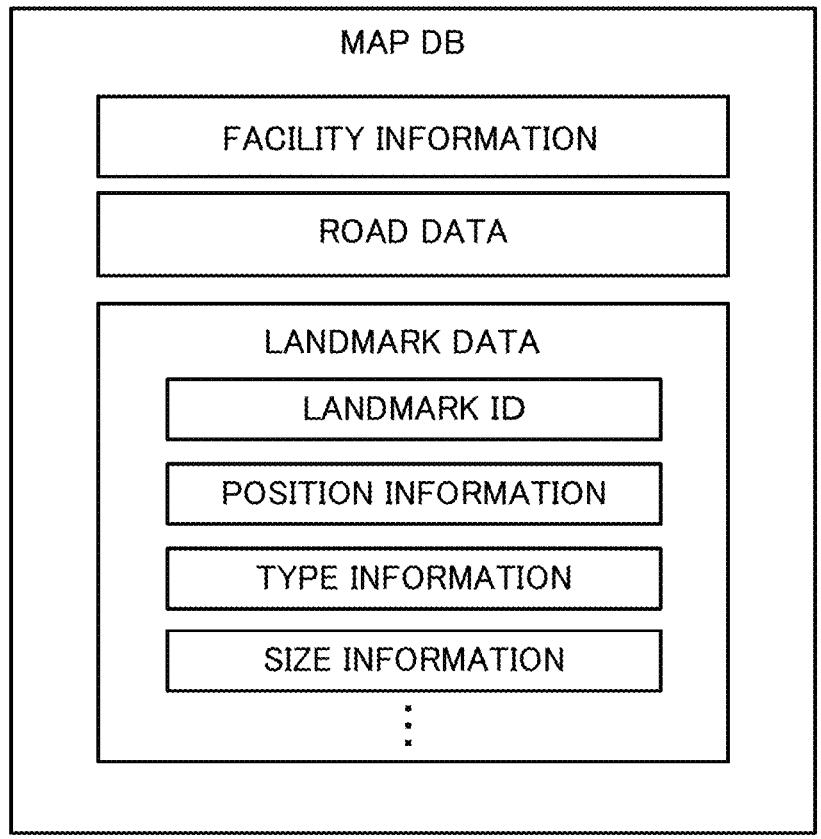
FIG. 3 illustrates an example of a schematic data-structure of map database (DataBase).

The storage unit 12 stores a program to be executed by the control unit 15, and the information necessary for the control unit 15 to execute a predetermined process. In this embodiment, the storage unit 12 stores a map DB 10 including the landmark data LD. FIG. 3 illustrates an example of the data structure of the map DB 10. As shown in FIG. 3, the map DB 10 includes facility information, road data, and the landmark data LD.

The landmark data LD is information for each feature serving as a landmark and herein includes, for each landmark, a landmark ID corresponding to the index of the landmark, position information thereof, type information thereof, and size information thereof. The position information indicates the absolute position of the landmark expressed by latitude and longitude (and altitude). It is noted that, when the landmark is a compartment line (i.e., a feature drawn on a road surface), the corresponding position information at least includes the coordinate data indicating the discrete positions of the compartment line. The type information is information indicating the type of the landmark, and at least indicates whether or not the landmark is a compartment line. The size information is information indicative of the size of the landmark, and, for example, it may be information indicating the vertical length and/or horizontal length (i.e., width) of the landmark, or it may be information indicating the area of the surface formed on the landmark.

The map DB 10 may be updated periodically. In this case, for example, the control unit 15 receives, via the communication unit 13, from the server device which manages the map information, the partial map information relating to the area to which the own vehicle position belongs, and reflects it into the map DB 10. Incidentally, the storage unit 12 may not store the map DB 10. In this case, for example, the control unit 15 communicates, via the communication unit 13, with a server device which stores the map data including the landmark data LD, and thereby acquires information necessary for the own vehicle position estimation process or the like as necessary.

Examples of the input unit 14 include a button, a touch panel, a remote controller, a voice input device, which are provided for the user to operate. The input unit 14 accepts an input for specifying a destination for the route search, an input for specifying ON or OFF of the autonomous driving operation, and the like. The information output unit 16 is, for example, a display or a speaker or the like for outputting information based on the control of the control unit 15.

The control unit 15 includes a CPU or the like for executing a program, and controls the entire in-vehicle device 1. In this example, the control unit 15 includes a posture angle calculator 17 and an own vehicle position estimator 18. The control unit 15 is an example of the "acquisition unit", the "normal vector calculation unit", the "angle calculation unit", the "position estimation unit", the "height calculation unit", and the "computer" that executes a program in the present invention.

The posture angle calculator 17 refers to the landmark data LD and calculates at least one of the pitch angle of the vehicle or the roll angle of the vehicle. Based on the output signal of the sensors and the map DB 10 supplied from the interface 11, The vehicle position estimator 18 estimates the position (the own vehicle position) of the vehicle equipped with the vehicle-mounted device 1. In this embodiment, as will be described later, the own vehicle position estimator 18 sets estimation parameters including the planar position of the vehicle (i.e., the position on the horizontal plane specified by latitude and longitude) and the yaw angle (i.e., azimuth orientation).

(3) Outline of Own Vehicle Position Estimation

First, an outline of the estimation process of the own vehicle position by the own vehicle position estimator 18 will be described.

The own vehicle position estimator 18 corrects the position of the vehicle estimated from the output data of the gyro sensor 3, the vehicle speed sensor 4, and/or the GPS receiver 5 based on the measurement values of the distance and the angle by the lidar 2 with respect to landmark(s) and the position information of the landmark(s) extracted from the map DB 10. In this embodiment, as an example, the own vehicle position estimator 18 alternately executes a prediction step of predicting the vehicle position from the output data of the gyro sensor 3, the vehicle speed sensor 4, and the like based on the state estimation method based on the Bayesian estimation, and a measurement update step of correcting the predicted value of the vehicle position calculated at the preceding prediction step. Various filters developed to perform Bayesian estimation such as an extended Kalman filter, an answered Kalman filter and a particle filter are available for the state estimation filter used at these steps. As described above, various methods have been proposed for position estimation based on Bayesian estimation.

In this embodiment, as an example, the own vehicle position estimator 18 performs the vehicle position estimation using the extended Kalman filter. In the following, the own vehicle position estimation using the extended Kalman filter will be briefly described.

Figure 4:
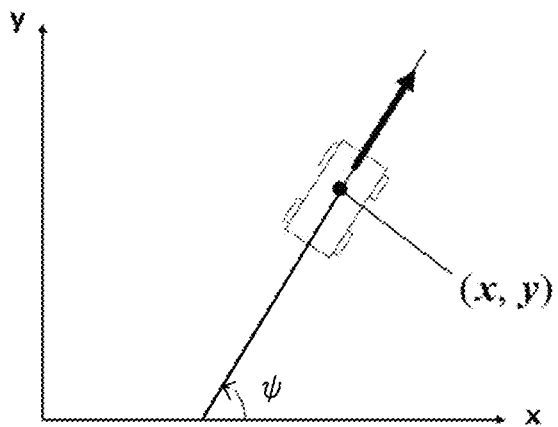
FIG. 4 illustrates a state variable vector in two-dimensional orthogonal coordinates.

FIG. 4 is a diagram showing a state variable vector in two-dimensional orthogonal coordinates. As shown in FIG. 4, the own vehicle position on a plane defined in the x-y two-dimensional orthogonal coordinate system is represented by the coordinates "(x, y)" and the azimuth orientation (yaw angle) "ψ" of the own vehicle. Here, the yaw angle ψ is defined as the angle formed by the traveling direction of the vehicle and the x-axis. The coordinates (x, y) indicate, for example, an absolute position corresponding to the combination of latitude and longitude, or a world coordinate indicating a position where the origin is a predetermined point.

Figure 5:
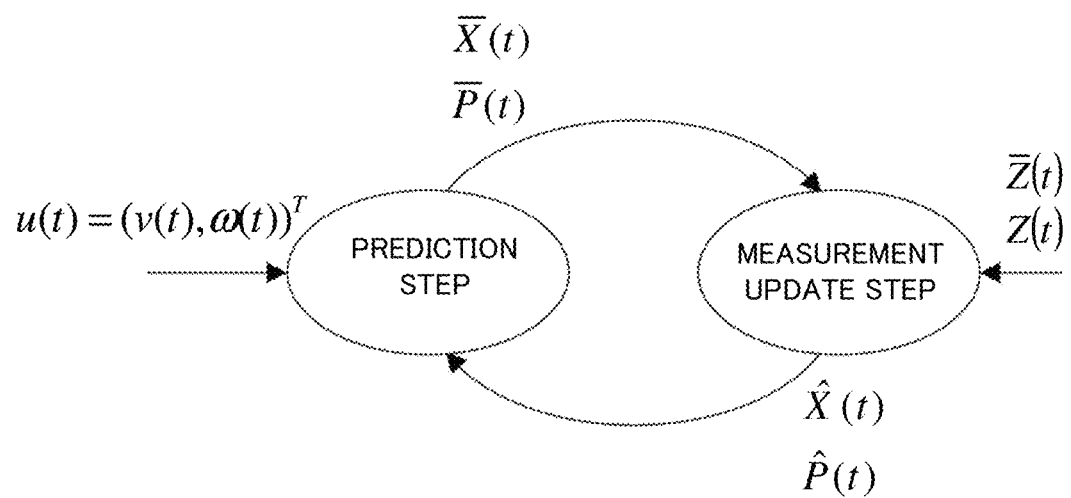
FIG. 5 illustrates a schematic relation between the prediction step and the measurement update step.
Figure 6:
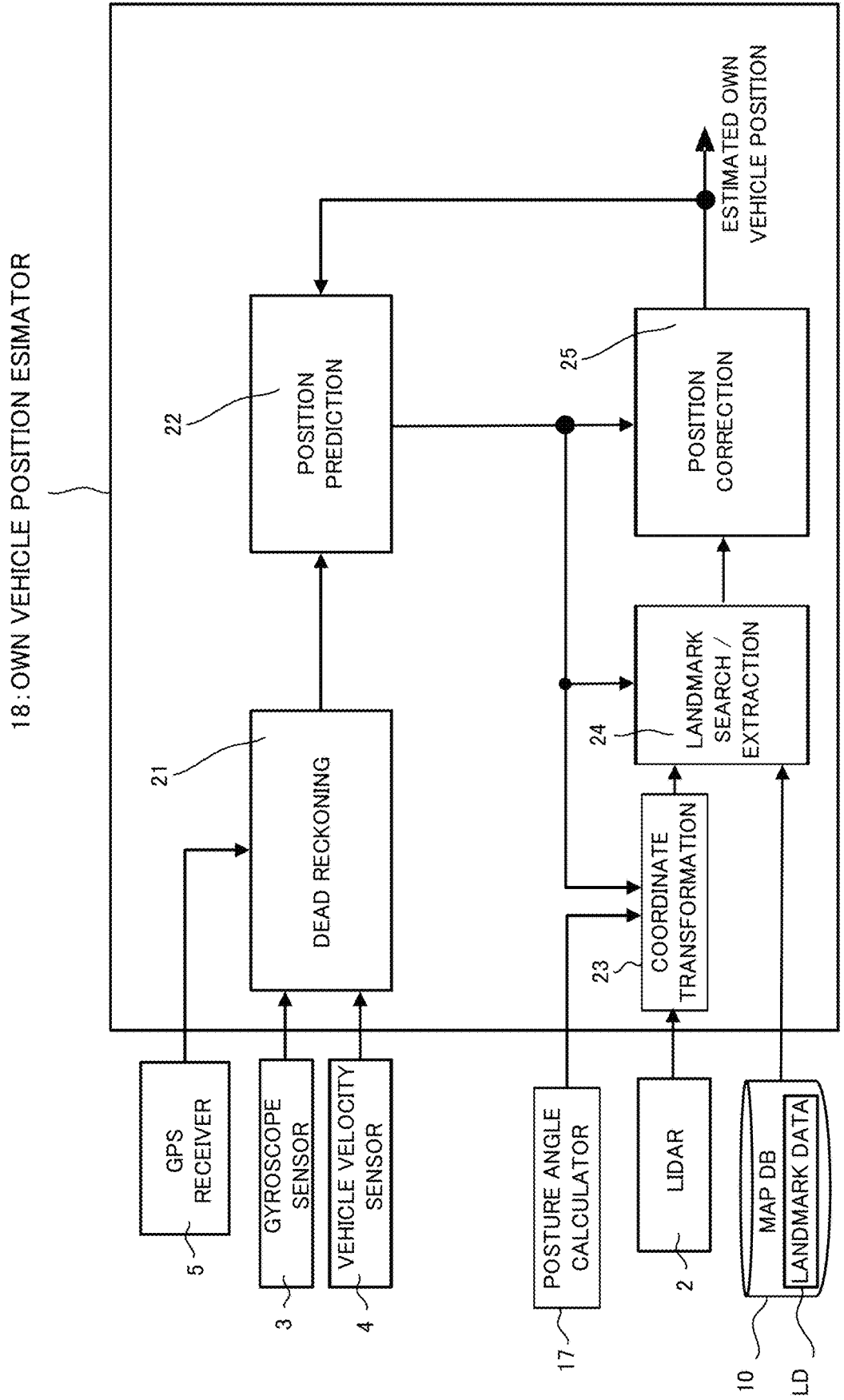
FIG. 6 illustrates an example of a functional block of a vehicle position estimator.

FIG. 5 is a diagram showing a schematic relation between the prediction step and the measurement update step. FIG. 6 shows an example of a functional block of the own vehicle position estimator 18. As shown in FIG. 6, the own vehicle position estimator 18 includes a dead reckoning block 21, a position prediction block 22, a coordinate transformation block 23, a landmark search/extraction block 24, and a position correction block 25.

As shown in FIG. 5, by repeating the prediction step and the measurement update step, the own vehicle position estimator 18 sequentially executes the calculation and update of the estimated value of the state variable vector "X" indicating the own vehicle position. In FIG. 5, the state variable vector at the reference time "t" (i.e., the current processing time) of calculation is denoted as "X$^-$(t)" or "X$^\wedge$(t)" (denoted as "state variable vector X(t)=(x(t), y(t), ψ(t))$^T$"). Here, the tentative estimate value (predicted value) calculated at the prediction step is marked with "−" above the character indicative of the predicted value, and the more accurate estimate value updated at the measurement update step is marked with "$^\wedge$" above the character indicative of the estimate value.

Specifically, as shown in FIGS. 5 and 6, at the prediction step, by using the moving speed "v" and the angular velocity "ω" (collectively referred to as "control value u(t)=(v(t), ω(t))$^T$") of the vehicle, the dead reckoning block 21 of the own vehicle position estimator 18 calculates the moving distance and the azimuth change from the previous (preceding) processing time. The position prediction block 22 of the own vehicle position estimator 18 calculates the predicted value (also referred to as "predicted own vehicle position") X$^-$(t) of the vehicle position at the time t by adding the calculated travel distance and the azimuth change to the state variable vector X$^\wedge$(t−1) at the time t−1 calculated at the preceding measurement update step. At the same time, the covariance matrix "P$^-$(t)" corresponding to the error distribution of the predicted own vehicle position X$^-$(t) is calculated from the covariance matrix "P$^\wedge$(t−1)" at time t−1 calculated at the preceding measurement update step.

At the measurement update step, the coordinate transformation block 23 of the own vehicle position estimator 18 converts the point cloud data outputted from the lidar 2 into data in the world coordinate system that is the same coordinate system as the map DB 10. In this case, the coordinate transformation block 23 performs the coordinate transformation of the point cloud data outputted by the lidar 2 at time t based on: the predicted vehicle position (i.e., the plane position and azimuth orientation of the vehicle) outputted by the position prediction block 22 at time t; and the height and the posture angles (here at least one of the pitch angle or roll angle) of the vehicle outputted by the vehicle posture angle calculator 17. Details of this coordinate transformation will be described later.

Then, the landmark search/extraction block 24 of the own vehicle position estimator 18 associates the position vector of target landmark(s) of measurement registered in the map DB 10 with the point cloud data which is outputted by the lidar 2 and which is converted into the world coordinate system by the coordinate transformation block 23. In this case, the landmark search/extraction block 24 determines whether or not there is a landmark existing within the detection range by the lidar 2, based on the landmark data LD and the predicted own vehicle position outputted by the position prediction block 22. Then, if a landmark existing within the detection range is registered in the landmark data LD, the landmark search/extraction block 24 sets a prediction window "Wp" that defines a range for detecting the target landmark. In this case, the landmark search/extraction block 24 sets, in the coordinate (world coordinate) space of the coordinate-transformed point cloud data outputted by the lidar 2, the prediction window Wp which is centered on the position indicated by the position information of the landmark data LD for the target landmark and which has a predetermined size. The prediction window Wp may be, for example, a cube. Then, the landmark search/extraction block 24 determines the presence or absence, within the prediction window Wp, of the measurement points indicated by the point cloud data with a high reflectance equal to or larger than be a predetermined threshold value. Then, if such measurement points exist, the landmark search/extraction block 24 determines that the above-described association has been successfully achieved, and determines a measurement value "Z(t)", that is measured based on the lidar 2, of the target landmark with successful association and a predicted measurement value "Z⁻(t)" that is a vector value indicating the position of the target landmark based on the predicted vehicle position X⁻(t) and the map DB 10. In this case, the landmark search/extraction block 24 calculates the representative position (e.g., position based on the average of the coordinate values) of positions indicated by the measurement points in the prediction window Wp extracted from the point cloud data as the measurement value Z(t) of the target landmark.

Then, as shown in the following equation (1), the position correction block 25 of the own vehicle position estimator 18 multiplies the difference value between the measurement value Z(t) and the predicted measurement value Z⁻(t) by the Kalman gain "K(t)", and adds the calculation result to the predicted own vehicle position X⁻(t) thereby to calculate the updated state variable vector (also referred to as the "estimated own vehicle position") $\hat{X}(t)$.

$$\hat{X}(t) = \overline{X}(t) + K(t)\{Z(t) - \overline{Z}(t)\} \quad (1)$$

At the measurement update step, in the same way as at the prediction step, the position correction block 25 of the own vehicle position estimator 18 obtains the covariance matrix P^(t) (simply referred to as P(t)) corresponding to the error distribution of the estimated vehicle position $\hat{X}(t)$) from the covariance matrix P⁻(t). Parameters such as Kalman gain K(t) can be calculated according to any known self-position estimation technique using an extended Kalman filter, for example.

It is noted that, when the position vectors of multiple features registered in the map DB 10 are associated with the scan data by the lidar 2, the own vehicle position estimator 18 may perform the measurement update step based on a set of the measurement prediction value and the measurement value corresponding to any feature selected from the multiple features, or may repeatedly perform the measurement update step based on all sets of the measurement prediction value and the measurement value corresponding to the multiple features. Taking into consideration that the lidar measurement accuracy deteriorates as the feature is farther from the lidar 2, in such a case where a plurality of sets of the measurement prediction value and the measurement value are used, the own vehicle position estimator 18 may decrease the weight on a feature with increasing distance between the lidar 2 and the feature.

As described above, the prediction step and the measurement update step are repeatedly performed, and the predicted own vehicle position X⁻(t) and the estimated own vehicle position $\hat{X}(t)$ are sequentially calculated, so that the most accurate vehicle position is calculated.

(4) Calculation of Posture Angles

Next, a description will be given of a calculation method of the pitch angle and the roll angle that are the posture angles of the vehicle by the posture angle calculator 17 using the landmark data LD.

(4-1) Calculation of Pitch Angle

First, a description will be given of a method for calculating the pitch angle of the vehicle by the posture angle calculator 17.

The posture angle calculator 17 refers to the landmark data LD and searches for a compartment line (white line) existing at or around the own vehicle planar position x, y (i.e., (x⁻, y⁻) or ($\hat{x}$, $\hat{y}$)) predicted or estimated by the own vehicle plane position estimator 18. Then, the posture angle calculator 17 refers to the landmark data LD corresponding to the searched compartment line, and acquires "n" pieces of the position information of the compartment line in world coordinate system. It is noted that, when the landmark is a compartment line, the corresponding landmark data LD includes, as the position information, for example, coordinate data which is represented by combinations of the latitude, the longitude, and the altitude and which indicates the discrete positions (discrete points) of the compartment line that are situated at intervals of several meters. The n pieces of position information of the compartment line in the world coordinate system acquired by the posture angle calculator 17 are an example of the "plural pieces of position information of a feature drawn on a road surface".

Figure 7A:
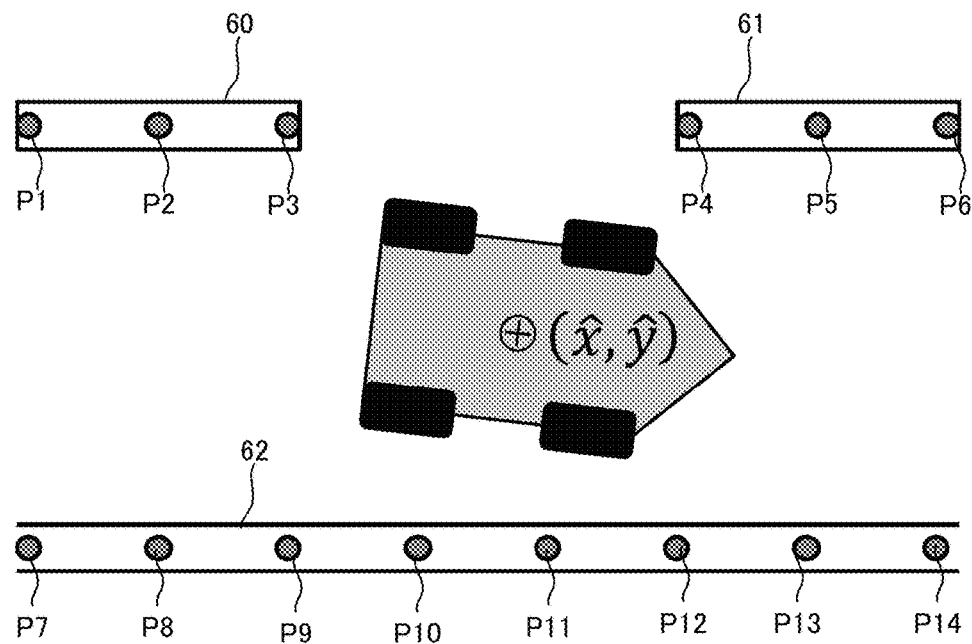
FIG. 7A is a plane view of a vehicle on the road which clearly indicates the position information of a compartment line.
Figure 7B:
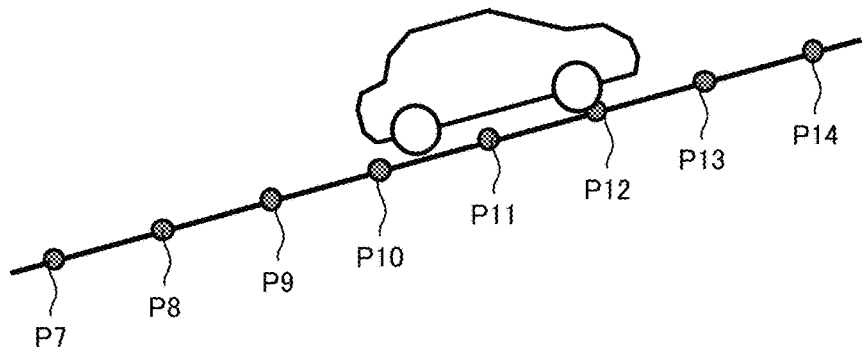
FIG. 7B is a side view of the vehicle on the road which clearly indicates the position information of the compartment line.

FIG. 7A is a plane view of the vehicle on a road with explicit indication of the position information of the compartment lines 60 to 62. FIG. 7B is a side view of the vehicle on the road with explicit indication of the position information of the compartment line 62. FIG. 7A illustrates the vehicle running on the road where the compartment lines 60 to 62 exist. Then, on the compartment line 60, there are positions P1 to P3 indicated by the position information registered in the landmark data LD, and on the compartment line 61, there are positions P4 to P6 indicated by the position information registered in the landmark data LD, and on the compartment line 62, there are positions P7 to P14 indicated by the position information registered in the landmark data LD.

In this case, the posture angle calculator 17 refers to the landmark data LD and recognizes that there are compartment lines 60 to 62 within a predetermined distance from the own vehicle plane position x, y (here, ($\hat{x}$, $\hat{y}$)) predicted or estimated by the own vehicle position estimator 18. Then, the posture angle calculator 17 acquires 14 (i.e., n=14) pieces of the position information of the compartment lines 60 to 62 in the world coordinate system corresponding to the positions P1 to P14 in total by referring to the landmark data LD corresponding to the compartment lines 60 to 62.

Next, the posture angle calculator 17 considers the road surface as a plane, and expresses the equation of the plane approximating the road surface by the following equation (2).

$$z = ax + by + c \tag{2}$$

Then, the posture angle calculator 17 substitutes the calculated n compartment line position vectors, $(x_1, y_1, z_1), (x_2, y_2, z_2), \ldots, (x_n, y_n, z_n)$, into the equation (2) and thereby acquires a simultaneous equation with n equations shown in the following equation (3).

$$\begin{cases} z_1 = ax_1 + by_1 + c \\ z_2 = ax_2 + by_2 + c \\ \ldots \\ z_n = ax_n + by_n + c \end{cases} \tag{3}$$

Here, expressing the equation (3) by a matrix, the following equation (4) is obtained.

$$\begin{bmatrix} x_1 & y_1 & 1 \\ x_2 & y_2 & 1 \\ \vdots & & \\ x_n & y_n & 1 \end{bmatrix} \begin{bmatrix} a \\ b \\ c \end{bmatrix} = \begin{bmatrix} z_1 \\ z_2 \\ \vdots \\ z_n \end{bmatrix} \tag{4}$$

Here, when "C" denotes the n×3 matrix on the left side, "a" denotes 3×1 matrix (i.e., vector) on the left side, and "b" denotes n×1 matrix (i.e., vector) on the right side, the equation (4) is expressed by the following equation (5).

$$Ca = b \tag{5}$$

Then, when the equation (5) is modified, the following equation (6) is obtained as a normal equation.

$$C^T Ca = C^T b \tag{6}$$

Therefore, when n is 3 or more, the posture angle calculator 17 can calculate, by the least squares method according to the following equation (7), the coefficient vector "a=[a, b, c]$^T$" of the plane equation shown in the equation (2).

$$a = (C^T C)^{-1} C^T b \tag{7}$$

Further, when the plane equation of the equation (2) is deformed, the following equation (8) is obtained.

$$-ax - by + z - c = 0 \tag{8}$$

Based on the equation (8), the normal vector "Vn" of the plane is expressed by the following equation (9).

$$v_n = \begin{bmatrix} -a \\ -b \\ 1 \end{bmatrix} \tag{9}$$

Figure 8:
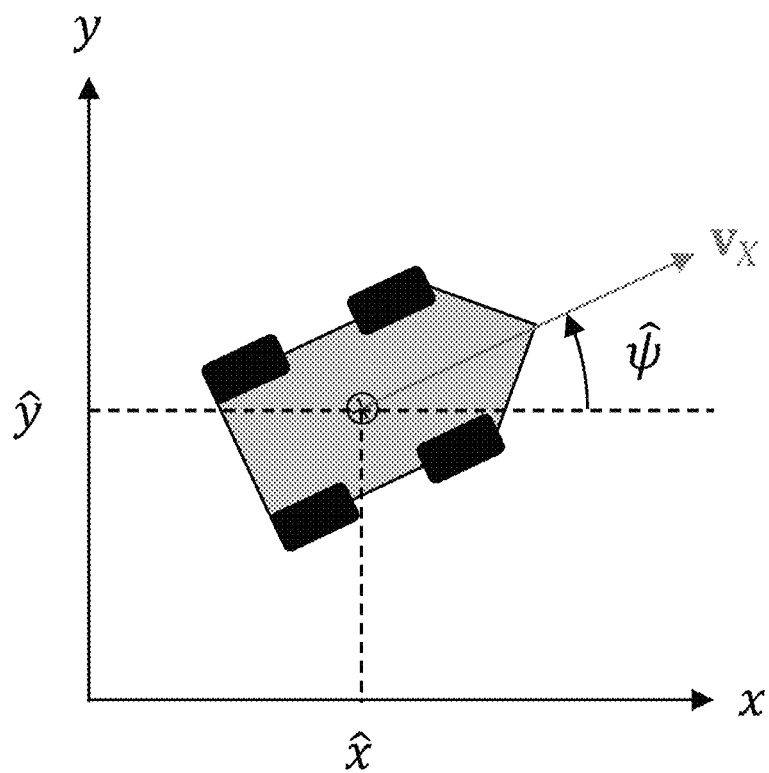
FIG. 8 is an x-y plane view showing the relation between the yaw angle of the vehicle and the traveling direction vector.

Further, the posture angle calculator 17 determines the orientation vector "Vx" of the vehicle on the x-y plane based on the yaw angle predicted or estimated by the own vehicle position estimator 18. FIG. 8 is a x-y plane view showing the relation between the yaw angle of the vehicle (here $\hat{\psi}$) and the traveling direction vector Vx. The z component of the traveling direction vector Vx is 0, and x component and y component, respectively are proportional to the cosine and sine of the yaw angle of the vehicle, respectively. Thus, the traveling direction vector Vx is given by the following equation (10).

$$v_X = \begin{bmatrix} \cos\hat{\psi} \\ \sin\hat{\psi} \\ 0 \end{bmatrix} \tag{10}$$

In this case, the angle "θ'" formed by the normal vector Vn and the traveling direction vector Vx is indicated by the following equation (11) which includes the inner product calculation of the normal vector Vn and the traveling direction vector Vx.

$$\cos\theta' = \frac{v_n \cdot v_X}{|v_n||v_X|} = \frac{-a\cos\hat{\psi} - b\sin\hat{\psi}}{\sqrt{a^2 + b^2 + 1}\sqrt{\cos^2\hat{\psi} + \sin^2\hat{\psi}}} = \frac{-a\cos\hat{\psi} - b\sin\hat{\psi}}{\sqrt{a^2 + b^2 + 1}} \tag{11}$$

Then, the posture angle calculator 17 calculates, based on the angle θ' formed by the normal vector Vn and the traveling direction vector Vx, the pitch angle "θ" of the vehicle.

Figure 9:
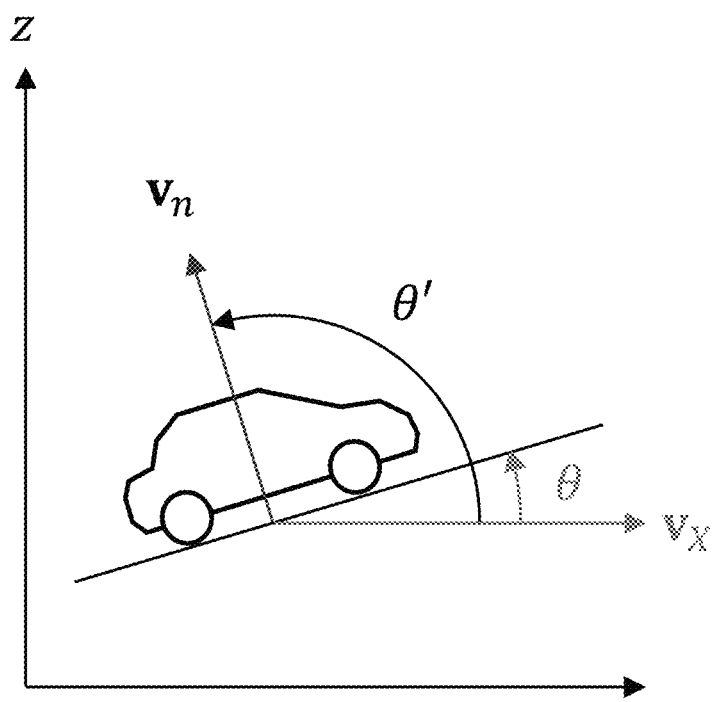
FIG. 9 illustrates the relation between the angle formed by the normal vector and the traveling direction vector and the pitch angle of the vehicle.

FIG. 9 shows the relation between the pitch angle θ of the vehicle and the angle θ' formed by the normal vector Vn and the traveling direction vector Vx. As shown in FIG. 9, the angle θ' formed by the normal vector Vn and the traveling direction vector Vx is larger by 90 degrees (i.e., π/2) than the pitch angle θ of the vehicle. Further, since the vehicle is constrained on the road surface, the inclination of the road surface in the traveling direction of the vehicle is equal to the pitch angle θ of the vehicle. Therefore, the posture angle calculator 17 calculates the pitch angle θ based on the following equation (12).

$$\theta = \theta' - \frac{\pi}{2} = \cos^{-1}\frac{-a\cos\hat{\psi} - b\sin\hat{\psi}}{\sqrt{a^2 + b^2 + 1}} - \frac{\pi}{2} \tag{12}$$

In this way, the posture angle calculator 17 can suitably calculate the pitch angle of the vehicle based on: a coefficient vector of the plane equation calculated from the n pieces of the compartment line position vector based on the landmark data LD of the compartment line; and the yaw angle predicted or estimated by the own vehicle position estimator 18.

It is noted that the height z$^-$ or z$^\wedge$ of the vehicle can be obtained by substituting the coefficient vector "a=[a, b, c]$^T$" calculated according to the equation (7) and the own vehicle plane position x, y into the equation (2).

(4-2) Estimation of Roll Angle

As with the calculation of the pitch angle, the posture angle calculator 17 calculates the normal vector Vn shown in the equation (9) by using then compartment line position vectors based on the landmark data LD.

Figure 10:
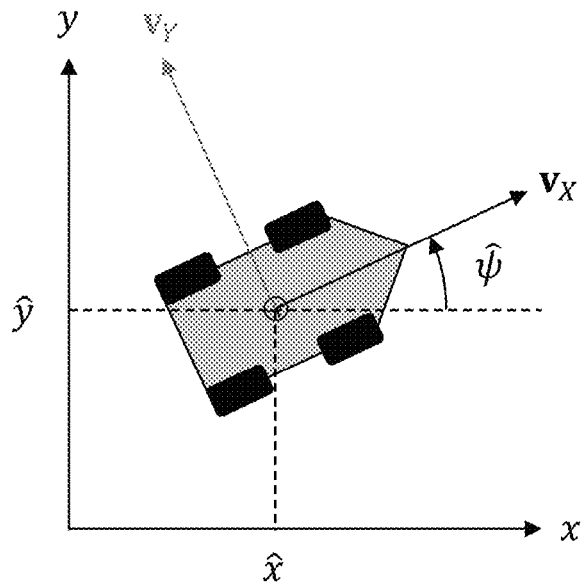
FIG. 10 is an x-y plane view showing the relation between the yaw angle of the vehicle and the lateral direction vector.

Further, the posture angle calculator 17 determines the lateral direction vector "V$_Y$" of the vehicle on the x-y plane based on the yaw angle predicted or estimated by the own vehicle position estimator 18. FIG. 10 is an x-y plane view showing the relation between the yaw angle of the vehicle (here, $\hat{\psi}$) and the lateral direction vector V$_Y$. As shown in FIG. 10, the lateral direction vector $V_Y$ corresponds to a direction in which the yaw angle (here $\hat{\psi}$) predicted or estimated by the own vehicle position estimator 18 is rotated by 90 degrees ($\pi/2$) along the x-y plane. Therefore, the lateral direction vector $V_Y$ is given by the following equation (13).

$$v_Y = \begin{bmatrix} \cos\frac{\pi}{2} & -\sin\frac{\pi}{2} & 0 \\ \sin\frac{\pi}{2} & \cos\frac{\pi}{2} & 0 \\ 0 & 0 & 1 \end{bmatrix} v_X = \begin{bmatrix} 0 & -1 & 0 \\ 1 & 0 & 0 \\ 0 & 0 & 1 \end{bmatrix} \begin{bmatrix} \cos\hat{\psi} \\ \sin\hat{\psi} \\ 0 \end{bmatrix} = \begin{bmatrix} -\sin\hat{\psi} \\ \cos\hat{\psi} \\ 0 \end{bmatrix} \quad (13)$$

In this case, the angle "$\varphi'$" formed by the normal vector Vn and the lateral direction vector $V_Y$ is expressed by the following equation (14), which includes the inner product computation of the normal vector Vn and the lateral direction vector $V_Y$.

$$\cos\phi' = \frac{v_n \cdot v_Y}{|v_n||v_Y|} = \frac{a\sin\hat{\psi} - b\cos\hat{\psi}}{\sqrt{a^2+b^2+1}\sqrt{\sin^2\hat{\psi}+\cos^2\hat{\psi}}} = \frac{a\sin\hat{\psi} - b\cos\hat{\psi}}{\sqrt{a^2+b^2+1}} \quad (14)$$

Then, the posture angle calculator 17 calculates, based on the angle $\varphi'$ formed by the normal vector Vn and the lateral direction vector $V_Y$, the roll angle "$\varphi$" of the vehicle.

Figure 11:
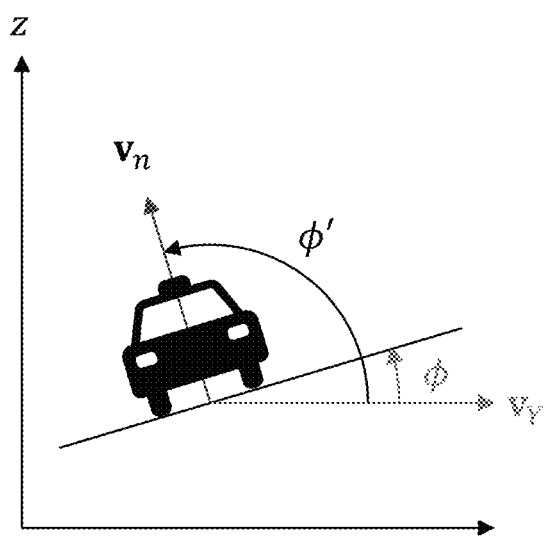
FIG. 11 illustrates the relation between the angle formed by the normal vector and the lateral direction vector and the roll angle of the vehicle.

FIG. 11 illustrates the relation between the roll angle $\varphi$ of the vehicle and the angle $\varphi'$ formed by the normal vector Vn and the lateral direction vector $V_Y$. As shown in FIG. 11, the angle $\varphi'$ formed by the normal vector Vn and the lateral direction vector $V_Y$ is larger by 90 degrees (i.e., $\pi/2$) than the roll angle $\varphi$ of the vehicle. Further, since the vehicle is constrained on the road surface, the inclination of the road surface in the lateral direction of the vehicle is equal to the roll angle $\varphi$ of the vehicle. Therefore, the posture angle calculator 17 calculates the roll angle $\varphi$ based on the following equation (15).

$$\phi = \phi' - \frac{\pi}{2} = \cos^{-1}\frac{a\sin\hat{\psi} - b\cos\hat{\psi}}{\sqrt{a^2+b^2+1}} - \frac{\pi}{2} \quad (15)$$

In this way, the posture angle calculator 17 can suitably calculate the roll angle of the vehicle based on: the coefficient vector of the plane equation calculated from n compartment line position vectors based on the landmark data LD; and the yaw angle predicted or estimated by the own vehicle position estimator 18.

(5) Coordinate Transformation of Point Cloud Data

Next, a description will be given of the coordinate transformation of the point cloud data based on the pitch angle calculated by the posture angle calculator 17.

The coordinate transformation block 23 of the own vehicle position estimator 18 generates, using the pitch angle $\theta$ calculated by the posture angle calculator 17, a rotation matrix "$R_\theta$" shown in the following equation (16).

$$R_\theta = \begin{bmatrix} \cos\theta & 0 & -\sin\theta \\ 0 & 1 & 0 \\ \sin\theta & 0 & \cos\theta \end{bmatrix} \quad (16)$$

Here, when n pieces of three-dimensional data are detected by the lidar 2, a matrix "$X_L$" representing these n pieces of three-dimensional data is represented by the following equation (17).

$$X_L = \begin{bmatrix} x_1 & y_1 & z_1 \\ x_2 & y_2 & z_2 \\ \vdots & \vdots & \vdots \\ x_n & y_n & z_n \end{bmatrix} \quad (17)$$

In this case, the coordinate transformation block 23 performs the coordinate transformation of the point cloud data with respect to the pitch angle $\theta$ according to the following equation (18).

$$X'_L = (R_\theta X_L^T)^T \quad (18)$$

Then, the coordinate transformation block 23 adds the predicted or estimated three-dimensional own vehicle position (x, y, z) to the n pieces of the three-dimensional data corresponding to each row of $X_L'$ in the equation (18). Thereby, the point cloud data in which the three-dimensional position x, y, z is also converted to the world coordinate system is generated. Then, the coordinate transformation block 23 supplies the point cloud data converted into the world coordinate system to the landmark search/extraction block 24.

Next, a description will be given of the coordinate transformation in consideration of both the pitch angle $\theta$ and the roll angle $\varphi$. Using the rotation matrix $R_\theta$ based on the pitch angle $\theta$ calculated by the posture angle calculator 17 and the rotation matrix "$R_\varphi$" based on the roll angle $\varphi$, the coordinate transformation block 23 generates the rotation matrix "R" to be multiplied by the matrix $X_L$ indicating n pieces of the three-dimensional data outputted by the lidar 2, according to the following equation (19).

$$R = R_\phi R_\theta = \begin{bmatrix} 1 & 0 & 0 \\ 0 & \cos\phi & \sin\phi \\ 0 & -\sin\phi & \cos\phi \end{bmatrix} \begin{bmatrix} \cos\theta & 0 & -\sin\theta \\ 0 & 1 & 0 \\ \sin\theta & 0 & \cos\theta \end{bmatrix} \quad (19)$$

In this case, the position prediction block 22 performs the coordinate transformation of the point cloud data to the world coordinate system with respect to the pitch angle $\theta$ and the roll angle $\varphi$ by the following equation (20).

$$X'_L = (R X_L^T)^T \quad (20)$$

Thereafter, the coordinate transformation block 23 performs the coordinate transformation of the point cloud data to the world coordinate system with respect to the yaw angle $\psi$, by multiplying $X_L'$ indicated by the equation (20) by the rotation matrix based on the yaw angle $\psi$ in the same way. Further, the coordinate transformation block 23 performs the coordinate transformation to the world coordinate system with respect to the three-dimensional position by adding the predicted or estimated vehicle position (x, y, z) to the n pieces of the three-dimensional data corresponding to each row of $X_L'$ after the coordinate transformation. Then, the coordinate conversion block 23 supplies the landmark search/extraction block 24 with the point cloud data converted into the world coordinate system through the above-described process.

In some embodiments, the coordinate transformation block 23 converts the point cloud data indicating three-dimensional positions with reference to the lidar 2 to data in the vehicle coordinate system, wherein each of the three-dimensional positions is expressed by a combination of the distance measured by the lidar 2 and the scan angle. The vehicle coordinate system is the coordinate system of the vehicle whose axes are along the traveling direction and the lateral direction of the vehicle. In this case, based on the information of the installation position and installation angle of the lidar 2 to the vehicle, the coordinate transformation block 23 converts the point cloud data in the coordinate system with respect to the lidar 2 to data in the vehicle coordinate system and further converts the converted point cloud data in the vehicle coordinate system to data in the world coordinate system according to the above-mentioned approach. Examples of the process of converting the point cloud data outputted by a lidar installed in the vehicle to data in the vehicle coordinate system is disclosed in WO2019/188745.

Further, the coordinate transformation block 23 may perform the coordinate transformation considering only the roll angle φ instead of considering both the pitch angle θ and the roll angle φ. In this case, the coordinate transformation block 23 may multiply the rotation matrix $R_\varphi$ shown in the equation (19) by the matrix $X_L$ representing n pieces of the three-dimensional data outputted by the lidar 2.

Next, the effect by the above-described coordinate transformation will be supplementally described with reference to FIGS. 12A, 12B and 13.

Figure 12A:
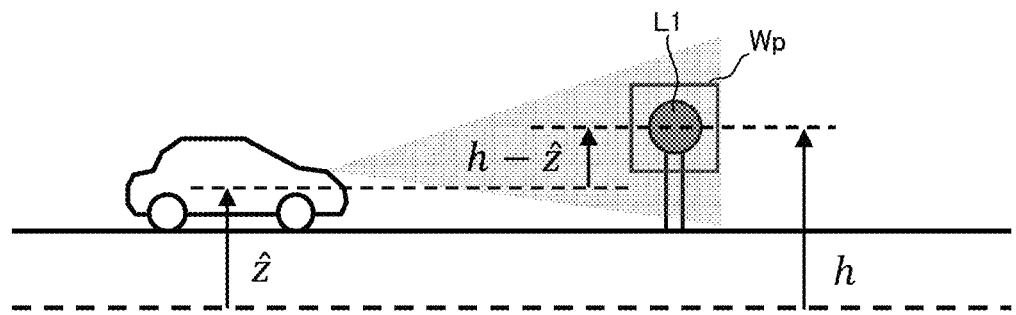
FIG. 12A is a side view of a road and the vehicle traveling on a flat road surface.

FIG. 12A is a side view of a road and the vehicle running on a flat road surface. In this case, when the own vehicle position estimator 18 extracts the sign "L1" existing around the current position as a landmark by referring to the landmark data LD, the own vehicle position estimator 18 acquires the position information of the sign L1 indicative of the height (e.g., the altitude) "h" of the sign L1 from the reference position. Then, in this case, the own vehicle position estimator 18 sets the predicted window Wp at a position higher than the vehicle by the difference "h−$\hat{z}$" between the predicted or estimated vehicle height z (herein, the estimated vehicle height $\hat{z}$) and the sign L1. Then, the own vehicle position estimator 18 calculates the measurement value Z(t) based on the average value or the like of the measurement points, existing within the prediction window Wp, of the lidar's point cloud data having a reflection intensity higher than a predetermined value, and then estimates the own vehicle position based on the equation (1).

Figure 12B:
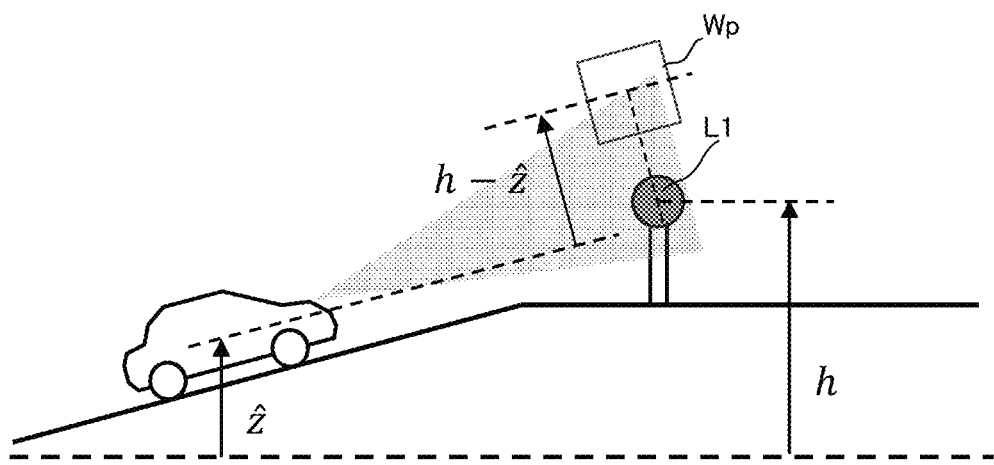
FIG. 12B is a side view of a road and the vehicle traveling on a road surface having a large gradient in the case of not performing the coordinate transformation of the point cloud data based on the pitch angle of the vehicle.

FIG. 12B is a side view of the road and the vehicle traveling on a large gradient road surface in the case of not performing the coordinate transformation of the point cloud data based on the pitch angle of the vehicle. In FIG. 12B, since the pitch angle occurs in the vehicle due to the road surface gradient, the point cloud data becomes upward. Therefore, if the own vehicle position estimator 18 sets the prediction window Wp centered on the position higher than the vehicle by the difference "h−$\hat{z}$" between the vehicle height $\hat{z}$ and the height of the sign L1 based on the landmark data LD, the prediction window Wp will not include the sign L1. Therefore, in this case, the own vehicle position estimator 18 cannot detect the measurement points of the point cloud data generated by the lidar 2 corresponding to the sign L1 and therefore cannot execute the vehicle position estimation using the sign L1 as a landmark.

Figure 13:
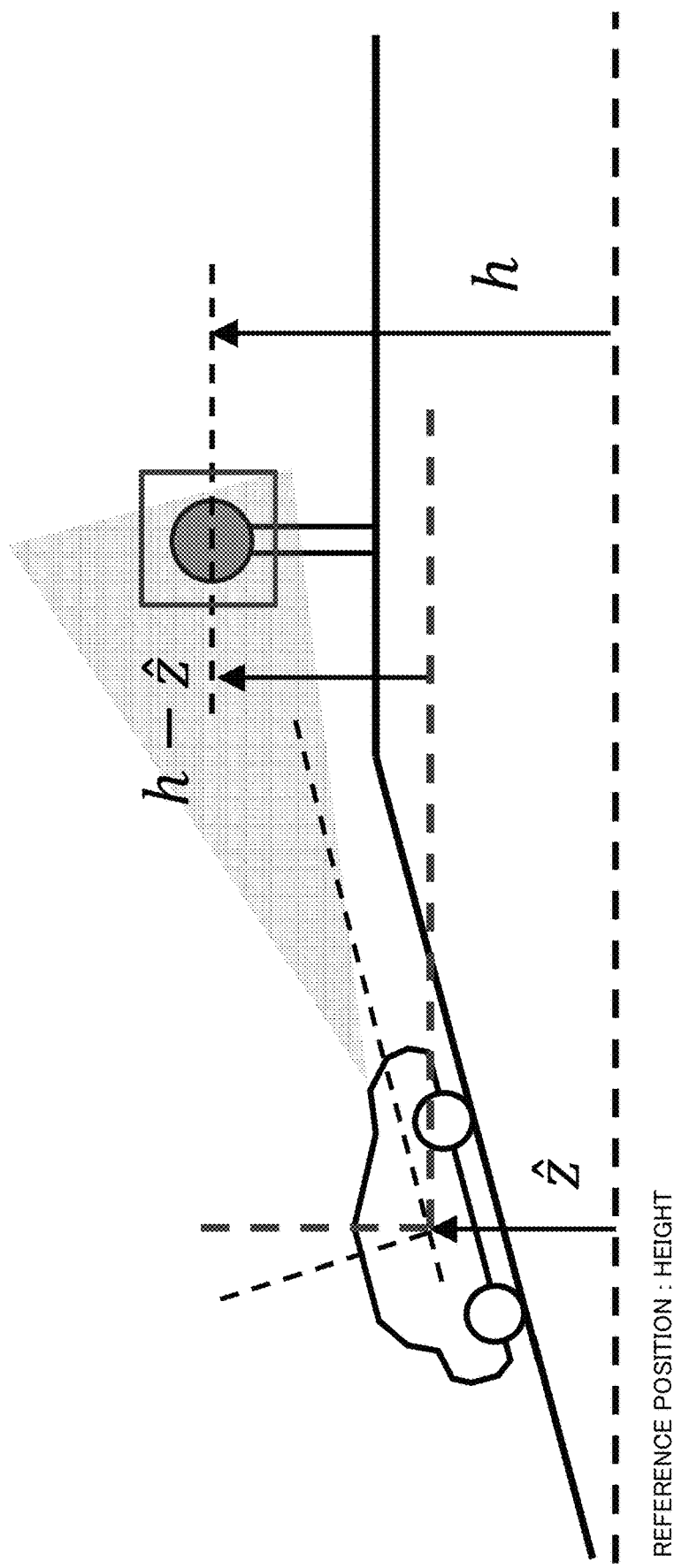
FIG. 13 is a side view of the road and the vehicle traveling on a road surface having a large gradient in the case of performing the coordinate transformation of the point cloud data based on the pitch angle of the vehicle.

FIG. 13 is a side view of the road and the vehicle traveling on a large slope road surface in the case of performing the coordinate transformation of the point cloud data based on the pitch angle of the vehicle based on the present embodiment. In this case, through the rotation matrix based on the pitch angle determined by the calculation method according to the embodiment, the point cloud data outputted by the lidar 2 is converted to data in the world coordinate system in consideration of the pitch angle of the vehicle. Therefore, in this case, the height from the vehicle to each measurement point of the point cloud data indicates the height in the world coordinate system. Therefore, in this case, by setting the prediction window Wp centered on the position higher than the vehicle by the difference "h−$\hat{z}$" between the vehicle height $\hat{z}$ and the height of the sign L1, the own vehicle position estimator 18 can extract the measurement points corresponding to the sign L1 from the point cloud data outputted by the lidar 2.

Even when traveling on a road where a cross slope such as a cant is present, the in-vehicle device 1 performs the coordinate transformation of the point cloud data based on the roll angle of the vehicle thereby to suitably extract the measurement points of the target landmark of measurement from the point cloud data based on the prediction window Wp.

(6) Processing Flow

Next, a specific processing flow of the position posture estimation process of the vehicle including the estimation of the pitch angle and the roll angle described above will be described with reference to flowcharts.

(6-1) Outline of Vehicle Position Posture Estimation Process

Figure 14:
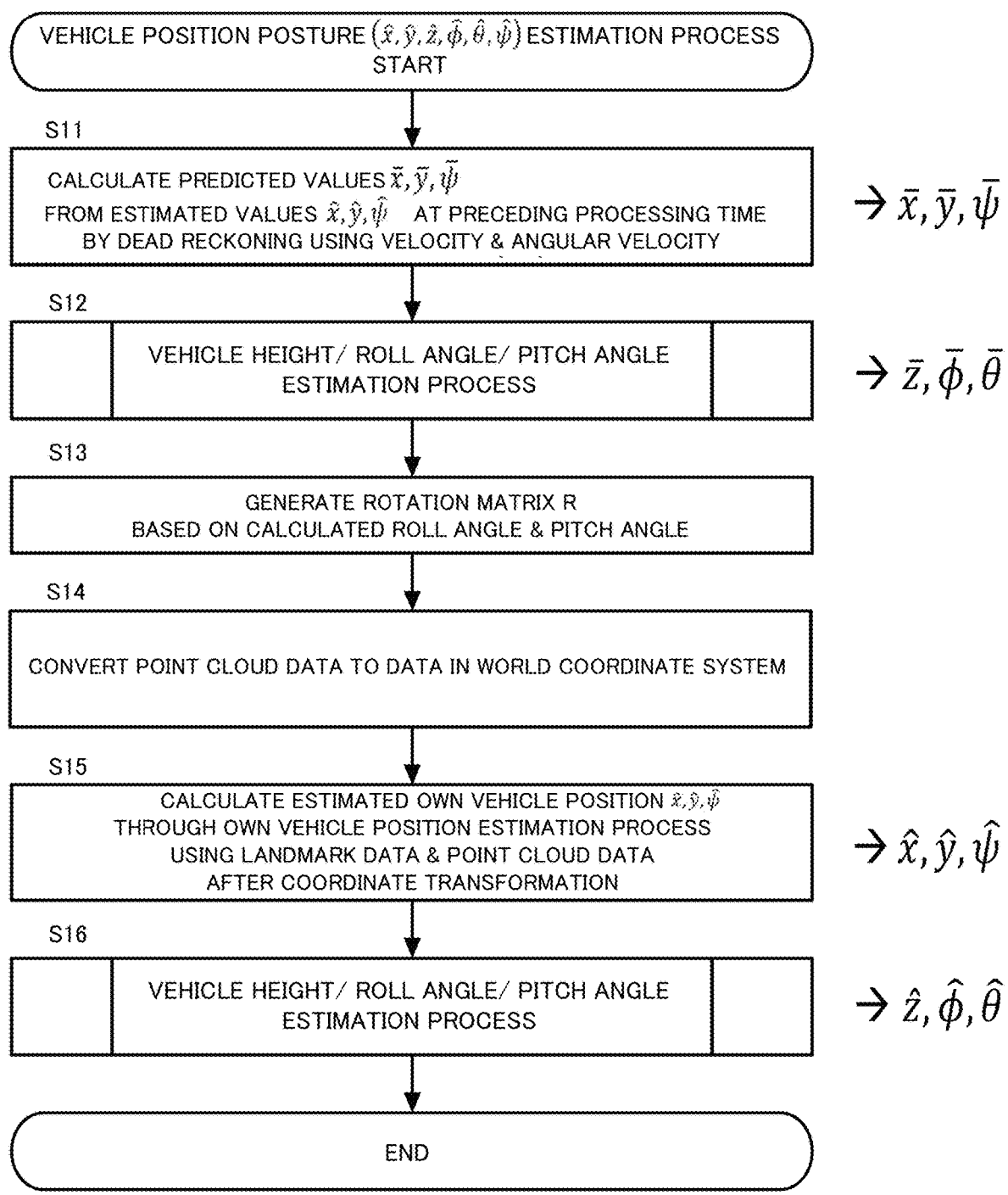
FIG. 14 is an example of a flowchart showing the procedure of a vehicle position posture estimation process.

FIG. 14 is an example of a flowchart showing the procedure of the vehicle position posture estimation process. The posture angle calculator 17 and the own vehicle position estimator 18 of the vehicle-mounted device 1 repeatedly executes the processing of the flowchart shown in FIG. 14 at predetermined time intervals at which the estimation of the position and the posture of the vehicle should be performed. Symbols displayed on the right of each step in FIG. 14 represents the elements to be calculated at each step.

First, the dead reckoning block 21 of the own vehicle position estimator 18 determines the movement distance and the azimuth orientation change from the previous time using the movement velocity and the angular velocity calculated based on the output by the gyro sensor 3, the vehicle velocity sensor 4, and the GPS receiver 5. Thereby, the position prediction block 22 of the vehicle position estimator 18 calculates the predicted vehicle position x⁻, y⁻, ψ⁻ at the current processing time from the estimated vehicle position $\hat{x}$, $\hat{y}$, $\hat{\psi}$ obtained at the preceding processing time (i.e., one processing time before the current processing time) (step S11).

Next, by performing the estimation process of the height (e.g., altitude), the roll angle, and the pitch angle of the vehicle, the posture angle calculator 17 calculates a predicted vehicle height "z⁻", a predicted roll angle "φ⁻" and predicted pitch angle "θ⁻" (step S12). This process will be described later with reference to FIG. 15.

Then, the coordinate transformation block 23 of the own vehicle position estimator 18 generates the rotation matrix R (see equation (19)) based on the roll angle and pitch angle calculated at step S12 (step S13). Then, the coordinate transformation block 23 converts the point cloud data to the data in the world coordinate system (step S14). Thereafter, the own vehicle position estimator 18 (i.e., the landmark search/extraction block 24 and the position correction block 25) performs the vehicle position estimation process based on the equation (1) using the point cloud data after the coordinate transformation and the landmark data LD, thereby to calculate the estimated vehicle position $\hat{x}$, $\hat{y}$, $\hat{\psi}$ at the current processing time (step S15). Thereafter, the posture angle calculator 17 calculates the estimated vehicle height "$\hat{z}$", the estimated roll angle "$\hat{\varphi}$", and the estimated pitch angle "$\hat{\theta}$" by performing the estimation process of the height, the roll angle, and the pitch angle of the vehicle in the same way as at step S12 again using the calculated estimated vehicle position $\hat{x}$, $\hat{y}$, $\hat{\psi}$ at the current processing time (step S16). This process will be described later with reference to FIG. 15.

(6-2) Vehicle Height/Roll Angle/Pitch Angle Estimation Process

Figure 15:
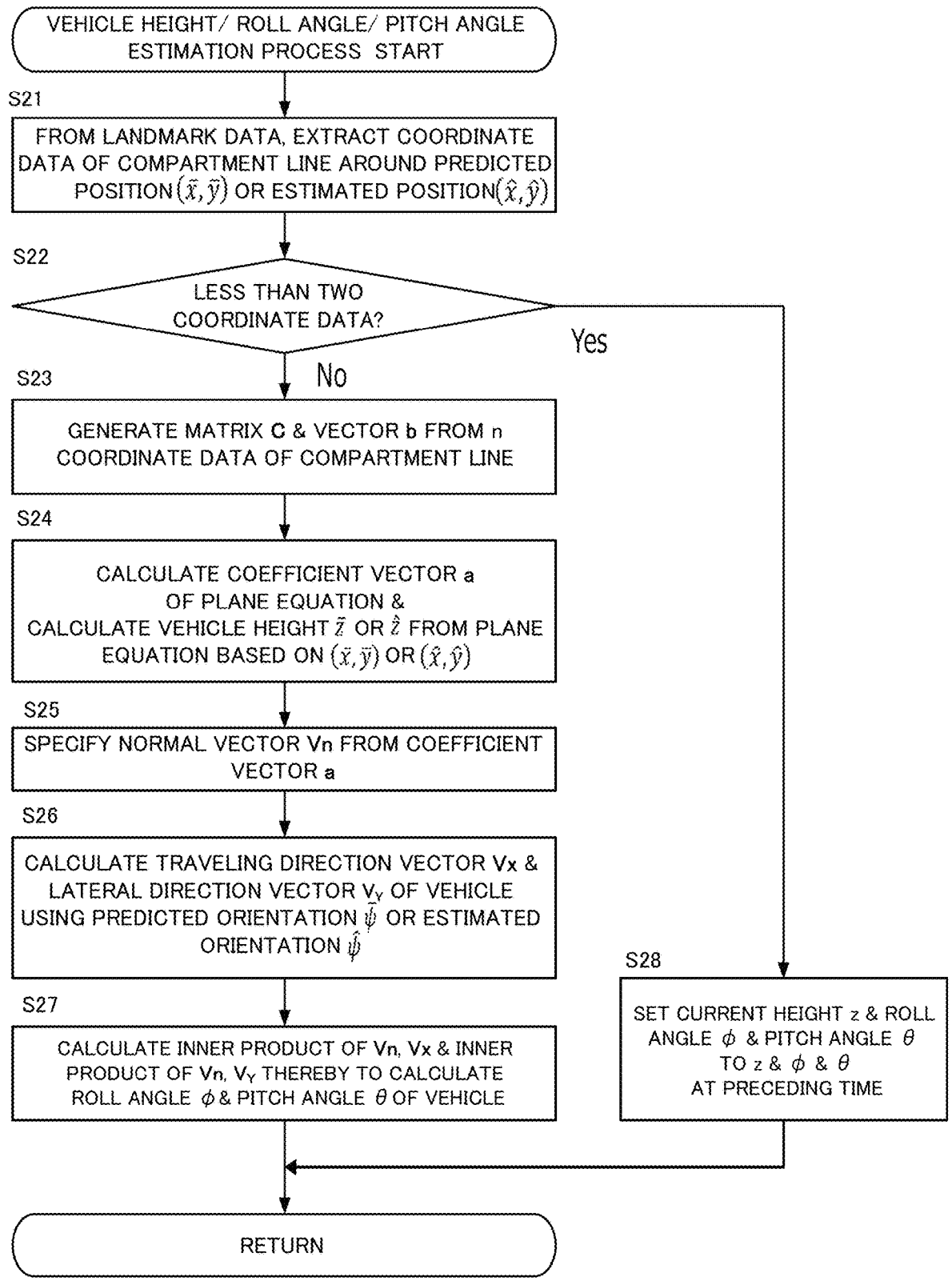
FIG. 15 is an example of a flowchart showing the procedure of a vehicle height/roll angle/pitch angle estimation process.

FIG. 15 is an example of a flowchart showing the procedure of the vehicle height/roll angle/pitch angle estimation process to be executed at step S12 and step S16 in FIG. 14.

First, the posture angle calculator 17 refers to the landmark data LD and extracts the position information of a compartment line (or compartment lines) existing at or around the predicted own vehicle position $x^-$, $y^-$ or the estimated own vehicle position $\hat{x}$, $\hat{y}$ (step S21). For example, the posture angle calculator 17 extracts, from the map DB 10, the landmark data LD of the compartment line including the coordinate data indicative of a position within a predetermined distance from the predicted own vehicle position $x^-$, $y^-$ or the estimated own vehicle position $\hat{x}$, $\hat{y}$.

Next, the posture angle calculator 17 determines whether or not the number of pieces of the coordinate data of the compartment line extracted at step S21 is less than three (step S22). Then, if the number of pieces of the coordinate data of the compartment line extracted at step S21 is less than three (step S22; Yes), the posture angle calculator 17 sets the predicted vehicle height $z^-$ or estimated vehicle height $\hat{z}$ calculated at the preceding processing time as the predicted vehicle height $z^-$ or estimated vehicle height $\hat{z}$ to be determined (step S28). Further, at step S28, the posture angle calculator 17 sets the roll angle φ (i.e., $\varphi^-$ or $\hat{\varphi}$) or pitch angle θ (i.e., $\theta^-$ or $\hat{\theta}$) at the preceding processing time as the roll angle φ (i.e., $\varphi_-$ or $\hat{\varphi}$) or pitch angle θ (i.e., $\theta^-$ or $\hat{\theta}$) to be determined at the current processing time.

On the other hand, if the number of pieces of the coordinate data of the compartment line extracted at step S21 is equal to or larger than three (i.e., n≥3) (step S22; No), the posture angle calculator 17 calculates, from the coordinate data of the n pieces of the coordinate data of the compartment line in the world coordinate system, the matrix C and the vector b according to the equations (4) and (5) (step S23). Next, based on the equation (7), the posture angle calculator 17 calculates the coefficient vector a by the least squares method, and then substitutes the predicted own vehicle position $x^-$, $y^-$ or the estimated own vehicle position $\hat{x}$, $\hat{y}$ into the plane equation (2), thereby to calculate the predicted vehicle length $z^-$ or estimated vehicle length $\hat{z}$ at the current processing time (step S24).

Next, the posture angle calculator 17 specifies the normal vector Vn shown in the equation (9) from the calculated coefficient vector a (step S25). Then, the posture angle calculator 17 calculates, using the yaw angle of the predicted or estimated vehicle (i.e., azimuth orientation) ψ ($\psi^-$ or $\hat{\omega}$), the traveling direction vector Vx shown in the equation (10) and the lateral direction vector $V_Y$ shown in the equation (13) (step S26). Thereafter, the posture angle calculator 17 not only calculates the inner product of the normal vector Vn and the traveling direction vector Vx based on the equation (11) but also calculates the inner product of the normal vector Vn and the lateral direction vector $V_Y$ based on the equation (14), thereby to calculate the roll angle φ (i.e., $\varphi^-$ or $\hat{\varphi}$) or pitch angle θ (i.e., $\theta^-$ or $\hat{\theta}$) to be determined at the current processing time (step S27).

As described above, the control unit 15 of the in-vehicle device 1 according to the present embodiment is configured to acquire, from landmark data LD that is map data including position information of one or more features, plural pieces of position information of a feature which is drawn on a road surface and which exists at or around a vehicle. Then, the control unit 15 is configured to calculate a normal vector of an approximate plane calculated based on the acquired plural pieces of the position information. Then, the control unit 15 is configured to calculate at least one of a pitch angle or a roll angle of the vehicle based on the orientation of the vehicle and the normal vector. According to this mode, the in-vehicle device 1 can calculate, based on the landmark data LD, at least one of the pitch angle or roll angle with high accuracy.

(7) Modification

Hereinafter, a description will be given of preferred modifications of the embodiment described above. The following modifications may be applied to the embodiment in combination.

(First Modification)

The vehicle-mounted device 1 may perform at least any estimation of the pitch angle or the roll angle of the vehicle based on the embodiment even when the vehicle position estimation based on the equation (1) is not performed.

In this case, for example, in FIG. 14, the in-vehicle device 1 repeatedly executes step S11 and step S12 to repeatedly perform at least one estimation of the pitch angle or roll angle of the vehicle based on the landmark data LD. Even in this case, the in-vehicle device 1 can use the estimated pitch angle or/and roll angle for various applications such as coordinate transformation of the output data of external sensor(s) such as the lidar 2 and hill (cant) detection processing.

(Second Modification)

The configuration of the driving support system shown in FIG. 1 is an example, and the configuration of the driving support system to which the present invention is applicable is not limited to the configuration shown in FIG. 1. For example, the driving support system may have, instead of having an in-vehicle device 1, the electronic control device of the vehicle executing the process to be executed by the posture angle calculator 17 and the own vehicle position estimator 18 of the in-vehicle device 1. In this case, the map DB 10 is stored in, for example, a storage unit in the vehicle or a server device configured to perform data communication with the vehicle, and the electronic control device of the vehicle estimates, by referring to the map DB 10, the roll angle or/and pitch angle and the own vehicle position based on the equation (1).

While the present invention has been described with reference to the embodiments, the present invention is not limited to the above embodiments. Various changes that can be understood by those skilled in the art within the scope of the present invention can be made in the configuration and details of the present invention. In other words, it is needless to say that the present invention includes various modifications that could be made by a person skilled in the art according to the entire disclosure including the scope of the claims, and the technical philosophy. In addition, all patent and non-patent literatures mentioned in this specification are incorporated by reference in its entirety.

DESCRIPTION OF REFERENCE NUMERALS

1 On-board device
2 Lidar
3 Gyroscope sensor
4 Vehicle velocity sensor
5 GPS receiver
10 Map DB

What is claimed is:

1. An information processing device comprising:
   an acquisition unit configured to acquire, from map data including position information of one or more features, plural pieces of position information of a feature which is drawn on a road surface and which exists at or around a moving body;
   a normal vector calculation unit configured to calculate a normal vector of a plane, which approximates a plane of the road surface, calculated based on the acquired plural pieces of the position information; and
   an angle calculation unit configured to calculate at least one of a pitch angle or a roll angle of the moving body, based on a traveling direction vector and a lateral direction vector of the moving body and the normal vector.

2. The information processing device according to claim 1,
   wherein the angle calculation unit calculates the pitch angle based on an inner product of
      a vector indicative of a traveling direction of the moving body on a horizontal plane and
      the normal vector.

3. The information processing device according to claim 1,
   wherein the angle calculation unit calculates the roll angle based on an inner product of
      a vector indicative of a lateral direction of the moving body on a horizontal plane and
      the normal vector.

4. The information processing device according to claim 1, further comprising
   a position estimation unit configured to perform position estimation of the moving body through matching between
      data obtained by a coordinate transformation of measurement data of a feature based on at least one of the pitch angle or the roll angle, the measurement data being outputted by a measurement unit mounted on the moving body, and
      the position information of the feature registered in the map data.

5. The information processing device according to claim 4,
   wherein position information of plural features is registered in the map data, and
   wherein, if a peripheral feature existing around the moving body is included in the plural features,
   the position estimation unit
      sets, based on the position information of the peripheral feature, a prediction range where the data obtained by the coordinate transformation of the measurement data of the peripheral feature is predicted to be included and
      performs the position estimation of the moving body through the matching between the data included in the prediction range and the position information of the peripheral feature.

6. The information processing device according to claim 1, further comprising
   a height calculation unit configured to calculate a height of the moving body from a reference position based on
      a height of the plane, which approximates the plane of the road surface, from the reference position calculated based on a plane equation indicative of the approximate plane and
      information indicative of a height of the moving body from the road surface.

7. A control method executed by an information processing device, the control method comprising:
   acquiring, from map data including position information of one or more features, plural pieces of position information of a feature which is drawn on a road surface and which exists at or around a moving body;
   calculating a normal vector of a plane, which approximates a plane of the road surface, calculated based on the acquired plural pieces of the position information; and
   calculating at least one of a pitch angle or a roll angle of the moving body, based on a traveling direction vector and a lateral direction vector of the moving body and the normal vector.

8. A non-transitory computer readable medium including instructions executed by a computer, the instructions comprising:
   acquiring, from map data including position information of one or more features, plural pieces of position information of a feature which is drawn on a road surface and which exists at or around a moving body;
   calculating normal vector of a plane, which approximates a plane of the road surface, calculated based on the acquired plural pieces of the position information; and
   calculating at least one of a pitch angle or a roll angle of the moving body, based on a traveling direction vector and a lateral direction vector of the moving body and the normal vector.

9. The information processing device according to claim 1, wherein the normal vector calculation unit is configured to calculate the normal vector if there are three or more pieces of the position information at or around the moving body.

10. The information processing device according to claim 1, wherein the normal vector calculation unit is configured to:
    calculate, by a least squares method, an equation of the plane, which approximates the plane of the road surface; and
    calculate the normal vector from a coefficient vector of the equation.

* * * * *